United States Patent
Petry

[11] 4,083,294
[45] Apr. 11, 1978

[54] MULTIPURPOSE BEVERAGE BREWER STRUCTURE

[75] Inventor: Stanton H. Petry, Arlington Heights, Ill.

[73] Assignee: Cory Food Services, Inc., Chicago, Ill.

[21] Appl. No.: 672,605

[22] Filed: Apr. 1, 1976

[51] Int. Cl.² ............................................. A47J 31/10
[52] U.S. Cl. ...................................... 99/279; 222/129
[58] Field of Search .......................... 99/279, 280–292, 99/275; 219/202; 222/129, 132, 146 HE, 202, 361, 559

[56] References Cited

U.S. PATENT DOCUMENTS

| | | | |
|---|---|---|---|
| 2,863,590 | 12/1958 | Giesse | 222/146 HE X |
| 3,084,047 | 4/1963 | Holstein et al. | 99/289 X |
| 3,218,175 | 11/1965 | Siegel et al. | 99/289 X |
| 3,291,034 | 12/1966 | Sohn et al. | 99/291 |
| 3,332,337 | 7/1967 | Lowry | 99/282 |
| 3,371,593 | 3/1968 | Price | 99/283 |
| 3,385,201 | 5/1968 | Martin | 99/282 |
| 3,536,496 | 10/1970 | Paoloni | 99/279 X |
| 3,589,559 | 6/1971 | Colton et al. | 222/146 HE X |
| 3,955,713 | 5/1976 | Hurley | 219/202 X |

Primary Examiner—Harvey C. Hornsby
Assistant Examiner—Timothy Simone
Attorney, Agent, or Firm—Wegner, Stellman, McCord, Wiles & Wood

[57] ABSTRACT

A multipurpose beverage brewer structure wherein a base member defining a base portion for a beverage brewer is selectively arranged to define a separate decanter warmer station and a storage receptacle for storing beverage additive ingredients. The receptacle may have a removable cover for covering the storage space when the base member is being used as an ingredient storing structure and separate warmer station.

10 Claims, 3 Drawing Figures

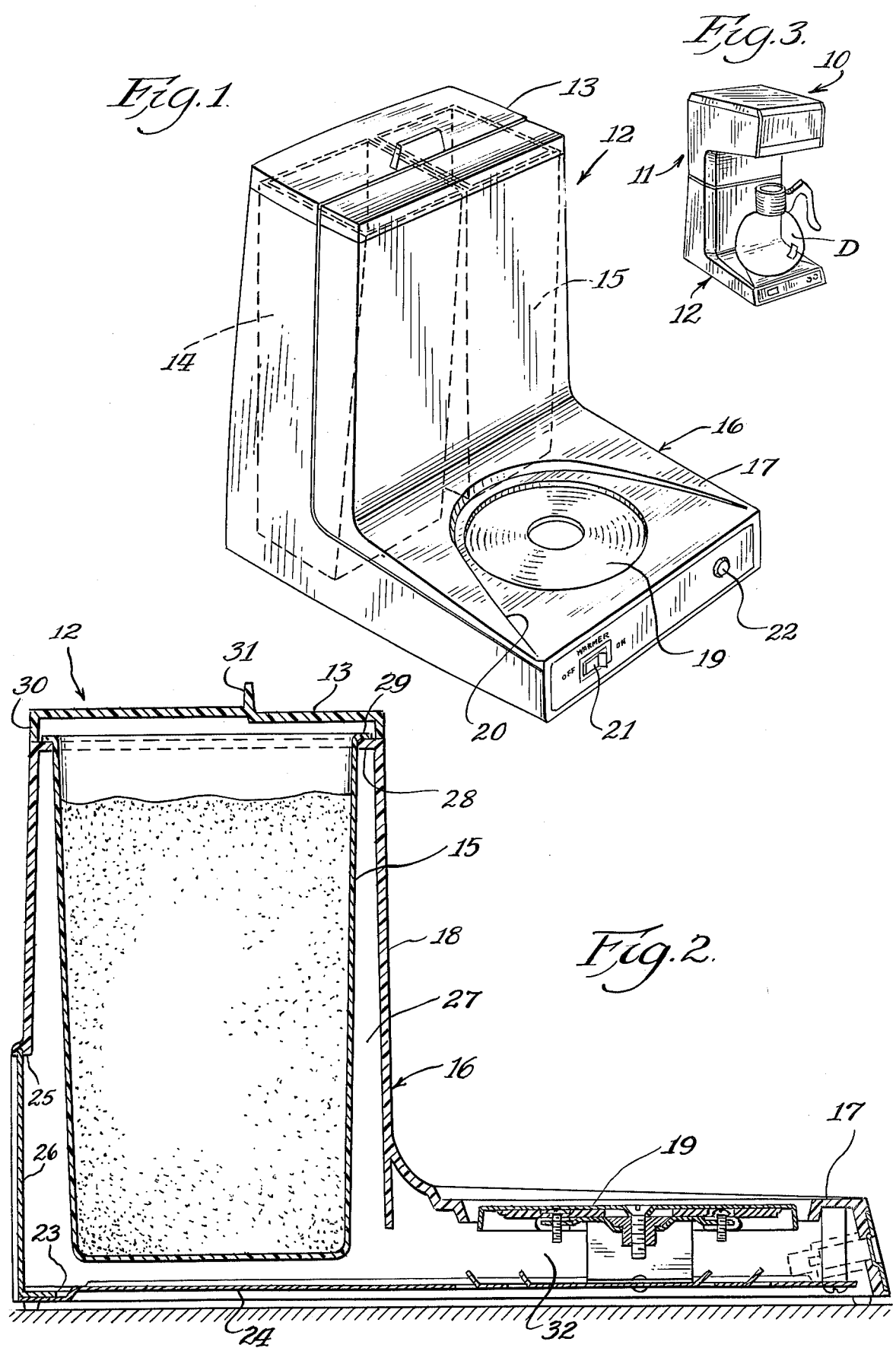

MULTIPURPOSE BEVERAGE BREWER STRUCTURE

BACKGROUND OF THE INVENTION

1. Field of the Invention

This invention relates to beverage brewers and in particular to receptacle structure for use in such beverage brewers.

2. Description of the Prior Art

In one form of conventional beverage brewer, the brewing structure is carried on a base member which is provided with a heating element such as for use in maintaining a decanter of beverage carried thereon at serving temperature. The brewer may include means for brewing a beverage such as coffee and delivering the brewed coffee into the decanter carried on the heating element. A portion of the base member may be utilized to support the brewing structure rearwardly of the heating element.

One excellent example of a beverage brewer having such a configuration is that shown in U.S. Pat. No. 3,589,273 of Harvy R. Karlen, which patent is owned by the assignee hereof.

Other examples of such brewing devices are those shown in U.S. Pat No. 3,092,012 of Edward J. Ruhnke; U.S. Pat. No. 3,320,073 of George Bixby, Jr. et al; U.S. Pat. No. 3,354,810 of Walter R. Lorang; U.S. Pat. No. 3,479,949 of Donald S. Reynolds et al; U.S. Pat. No. 3,513,767 of Harold Bloomfield, et al; and U.S. Pat. No. 3,385,201 of John C. Martin.

SUMMARY OF THE INVENTION

The present invention comprehends an improved multipurpose beverage brewer structure for use relative to such beverage brewing devices wherein the structure may be selectively utilized as the base element of the beverage brewer, or as a separate warming station having integrally asssociated beverage additive ingredient storing means.

The multipurpose structure may include a base member defining a base portion for a beverage brewer, a decanter warmer carried on the base member for maintaining a decanter of beverage at serving temperature, storage means on the base member for storing beverage additive ingredients, and removable covering means for selectively covering the storage means when the base member is being used for ingredient storing.

In the illustrated embodiment, the decanter warmer provides heat to the storage means tending to maintain the pulverulent beverage additive ingredients dry.

The storage means may comprise an upright portion of the base member and may include ingredient-receiving receptacles removably carried in the upright portion.

The upper portion of the base member may support the cover when the structure is utilized as a separate warmer station, or may be utilized as the portion of the base member connecting it to the remainder of the beverage brewer when the base member is utilized as the base portion of the beverage brewer.

The storage means may comprise a plurality of receptacle for holding different additive ingredients.

The cover may be provided with suitable handle means.

The base member may be provided with a reinforcing means which, in the illustrated embodiments, may comprise an inturned flange supporting the removable receptacle.

Thus, the multipurpose beverage brewer structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a multipurpose beverage brewer structure embodying the invention;

FIG. 2 is an enlarged vertical section thereof; and

FIG. 3 is a perspective view of the structure as utilized in a beverage brewer.

DESCRIPTION OF THE PREFERRED EMBODIMENT

In the exemplary embodiment of the invention as disclosed in the drawing, a beverage brewer generally designated 10 is shown to include a brewing portion generally designated 11 and a lower support portion generally designated 12. The brewing portion 11 may comprise any suitable brewing structure and, illustratively, more specifically, may comprise a brewing structure such as that disclosed in the above-identified Karlen U.S. Pat. No. 3,589,273. The support portion 12, however, comprises a separate portion of the brewer which may be used not only as the support portion of the brewer, but alternatively, as shown in FIGS. 1 and 2, may define a separate warming station and beverage additive ingredient storing means. When so used, the structure 12 is provided with a cover 13 and a pair of ingredient storing receptacles 14 and 15, as will be described more fully hereinafter.

As shown in FIGS. 1 and 2, the support portion 12 includes a base member generally designated 16, having a front, low height portion 17 and a rear, upwardly extending portion 18. The front portion is provided with an upwardly exposed heater 19 opening through a recessed portion 20 of the base member portion 17, as best seen in FIG. 1. The heater is adapted to support a conventional decanter D, as shown in FIG. 3, for receiving the brewed beverage from the brewing structure 11, with the heater maintaining the brewed beverage at serving temperature. A suitable control switch 21 may be mounted to base member portion 17 for selectively controlling the operation of the heater. An indicating light element 22 may be provided on base member portion 17 for indicating the energization of the heater.

As best seen in FIG. 2, base member 16 may be downwardly open, with the lower opening 23 being closed by a bottom plate 24. A rear opening 25 may be provided in the upright portion 18 which may be closed by a cover plate 26. Where the support structure 12 is utilized as the support portion of the beverage brewer 10, the space 27 in upright portion 18 may contain portions of the brewing structure, such as the lower end of a heating tank, and electrical control equipment, etc., with the removable cover 26 providing selective access to the beverage brewer structure therein.

When the support structure 12 is utilized as a separate warmer station and additive ingredient storage means, the receptacles 14 and 15 are installed to extend downwardly into space 27, as shown in FIG. 2. Where the beverage brewed in the apparatus is coffee, the receptacles 14 and 15 may hold pulverulent materials, such as powdered cream material and sugar.

The upper end of the upright portion 18 may define an inturned flange 28 adapted to support an outturned flange 29 on the upper end of the receptacles 14 and 15, whereby the receptacles may be readily installed and removed relative to the storage means.

Cover 13 may be provided with a downturned flange 30 resting on the upper end of the base upper portion 18, with the outturned flanges 29 of the receptacles 14 and 15 defining means for effectively retaining the cover against lateral displacement therefrom, as best seen in FIG. 2.

The cover may be provided with an integral upstanding handle 31 for facilitated manipulation of the cover for providing selective access to the ingredients in the receptacles 14 and 15, as desired.

Flange 28 effectively defines a reinforcing means maintaining the dimensional stability of the upper portion of the upright base member portion 18.

The disposition of the receptacles 14 and 15 rearwardly adjacent the heater 19 permits the heater to define means for effectively maintaining the pulverulent material in the receptacles relatively dry as a result of the slight warming action effected thereby on the materials in the receptacles 14 and 15. As shown in FIG. 2, space 27 may open to the space 32 subjacent to the heater 19 convective flow of warm air therebetween.

The interchangeability of the support structure 12 as a support for the brewer structure 11 or as an independent warming station and ingredient storing means permits the structure to be utilized as a replacement for a damaged support structure of the brewer 10 and further permits effectively improved economy in the manufacture of the brewing apparatuses and individual warming station and ingredient storing structures.

The foregoing disclosure of specific embodiments is illustrative of the broad inventive concepts comprehended by the invention.

I claim:

1. A multipurpose beverage brewer structure comprising: a base member defining a base portion for selectively supporting a beverage brewing means; a decanter warmer carried on the base member for maintaining a decanter of beverage at serving temperature; storage means selectively carried on the base member for storing beverage additive ingredients, said base member and said storage means having cooperating support portions for supporting said storage means, said storage means support portions effectively precluding use of the base member to support the beverage brewing means when so carried on the base member; and removable covering means for selectively covering the storage means when the base member is being used for ingredient storing.

2. The multipurpose beverage brewer structure of claim 1 wherein said additive ingredients comprise pulverulent material and said warmer provides heat to said storage means tending to maintain the pulverulent material dry.

3. The multipurpose beverage brewer structure of claim 1 wherein said storage means comprises an upright portion of said base member.

4. The multipurpose beverage brewer stucture of claim 1 wherein said storage means comprises cup means carried in the base member.

5. The mulitpurpose beverage brewer structure of claim 1 wherein said storage means comprises cup means removably carried in the base member.

6. The multipurpose beverage brewer structure of claim 1 wherein said base member defines an upper brewing means support portion for alternatively carrying said covering means.

7. The multipurpose beverage brewer structure of claim 1 wherein said storage means comprises an upright portion of said base member and a plurality of receptacle for holding said additive ingredients within said upright portion.

8. The multipurpose beverage brewer structure of claim 1 wherein said covering means is provided with integral handle means.

9. The multipurpose beverage brewer structure of claim 1 wherein said base member defines an upwardly opening top portion having a reinforcing peripheral flange.

10. The multipurpose beverage brewer structure of claim 1 wherein said base member defines an upwardly opening portion removably receiving said storage means.

* * * * *